(12) United States Patent
Gupta

(10) Patent No.: US 6,475,774 B1
(45) Date of Patent: Nov. 5, 2002

(54) REACTION PLATE SEALING MEANS

(76) Inventor: Hemant Gupta, 33170 Central Ave., Union City, CA (US) 94587

( * ) Notice: Subject to any disclaimer, the term of this patent is extended or adjusted under 35 U.S.C. 154(b) by 0 days.

(21) Appl. No.: 09/956,592

(22) Filed: Sep. 18, 2001

(51) Int. Cl.[7] .................................................. C12M 1/34
(52) U.S. Cl. ............................... 435/287.2; 435/287.6; 435/288.3; 435/305.3; 435/305.4; 215/247
(58) Field of Search ........................... 435/287.2, 287.6, 435/288.1, 288.3, 304.1, 305.1, 305.2, 305.3, 305.4; 215/50, 247, 320, 355, 361; 604/6.05, 6.06, 6.15

(56) References Cited

U.S. PATENT DOCUMENTS

| | | | | |
|---|---|---|---|---|
| 3,872,992 A | * | 3/1975 | Larson | 141/329 |
| 4,134,512 A | * | 1/1979 | Nugent | 215/247 |
| 4,683,195 A | | 7/1987 | Mullis et al. | 435/6 |
| 4,886,177 A | * | 12/1989 | Foster | 215/247 |
| 5,036,992 A | * | 8/1991 | Mouchawar et al. | 215/247 |
| 5,202,093 A | * | 4/1993 | Cloyd | 215/247 |
| 5,297,599 A | * | 3/1994 | Bucheli | 141/18 |
| 6,202,878 B1 | * | 3/2001 | Cook | 215/247 |
| 6,361,744 B1 | * | 3/2002 | Levy | 215/247 |

* cited by examiner

*Primary Examiner*—David A. Redding
(74) *Attorney, Agent, or Firm*—David T. Bracken

(57) ABSTRACT

The invention comprises a wide range of pierceable and memory-recloseable septa cover for multi-well plates for PCR or other small sample well processes, where such seals are joined into an easily applied or removed sheet or otherwise joined means. A reaction chamber well comprises a liquid level portion at the bottom that contains the various levels of reaction liquid, a super-liquid portion comprising the gas volumes above the reaction liquid. In one form of the invention embodiments, the cover comprises a gas tight seal between the cover and the side of the well substantially above the liquid level, thereby forming the super-liquid space. The disturbance, pressure change and/or gas exchange in this small gas space results in a rather dramatic potential change in reaction or mixing results. The invention cover reduces each of these to a minimum not attainable in the prior art.

18 Claims, 6 Drawing Sheets

REACTION PLATE SEALING MEANS

BACKGROUND OF THE INVENTION

The invention relates to a disposable or reusable device for carrying out a process in which a biological sample is processed with one or more reagents. The invention relates in particular to a device which is suitable for carrying out a process for obtaining a purified nucleic acid sample from a biological sample.

Known methods for obtaining a purified nucleic acid sample suitable to be amplified, by, for example, a polymerase chain reaction (PCR) are usually carried out manually and involve a number of steps and in particular a plurality of pipetting operations. Since contamination of the purified sample to be obtained has to be reduced as far as possible, the manual process has to be carried out with great care and is therefore a time consuming task. Known apparatus for automatically carrying out pipetting operations in analyzer systems have been found inadequate for methods aiming to obtain purified nucleic acid samples suitable to be amplified, such as by a polymerase chain reaction (PCR), because contamination of the sample is likely to occur during pipetting operations.

Amplification reactions allow the detection of minute amounts of nucleic acids. When amplifications are carried out according to the PCR principle (e.g. U.S. Pat. No. 4,683,195), the samples must be prepared in a particularly careful manner in order to isolate the nucleic acids as there are many biological substances which may interfere with the function of the polymerase used in this method. Due to the extremely high sensitivity of this method, it is also necessary that carry-over be avoided in this procedure under all circumstances.

It is well known that the PCR is carried out in a multi-well plastic plate which contains a standard number of wells, i.e., 96 or 384. The small volumes of the wells are generally in the range 30 and 100 millimicroliters, a volume range for water based solutions where even a short exposure to non-equilibrium water vapor air and/or substantial turbulence causing gas volume exchange above the liquid in the wells results in substantial volume and/or non-water component damage as a result of turbulence, condensation and/or evaporation effects. This applies in particular if frequent changing of the temperature of the solutions between high and low temperatures is required, as occurs in the case of the PCR, wherein individual nucleic acid strands are susceptible to undesirable fragmentation, concentration or dilution. The high degree of sensitivity of these tests translates into a high degree of required care with the super-liquid surface gas above the sample surface in the well.

It is clear that the well liquid must have a cover with a gas tight seal. The prior art solves this problem in many ways. The problem with these prior art seals for a multi-well plate is that the seals are either joined in a continuous sheet such that the removal and reapplication after thermal cycling causes condensate to cling to the inside seal surface so that substantial amounts of the sample liquid are dried quickly or drop into other wells or the seals are individual plugs which are removed via single removal or require a special interface to remove or replace the plugs. There is clearly a need for a continuous sheet of well seals that eliminates liquid loss and contamination as experienced in the prior art.

SUMMARY OF THE INVENTION

The invention comprises a wide range of pierceable and memory-recloseable septa cover for multi-well plates for PCR or other small sample well processes, where such seals are joined into an easily applied or removed sheet or otherwise joined means. A reaction chamber well comprises a liquid level portion at the bottom that contains the various levels of reaction liquid, a super-liquid portion comprising the gas volumes above the reaction liquid. In one form of the invention embodiments, the cover comprises a gas tight seal between the cover and the side of the well substantially above the liquid level, thereby forming the super-liquid space. The disturbance, pressure change and/or gas exchange in this small gas space results in a rather dramatic potential change in reaction or mixing results. The invention cover reduces each of these to a minimum not attainable in the prior art.

The invention cover in one embodiment comprises a concave or hollow cylindrical (i.e., convex or flat as to the super-liquid space) user side that is slightly pressed on an outer surface against the side of the rigid well inner walls. At the bottom of the concavity or hollow cylindrical portion is a beveled or rounded impression having along its lowest impression trace a minimum thickness defining the pierceable septum, pierceable by the standard pipette tip. A most critical aspect of the invention is the presence of the impression whereby the septum opening and closing within the super-liquid space comprises a minimum disturbance into that space.

An example of the PCR follows as typical of liquid addition and/or subtraction by pipette tip or other relatively rigid cannula or conduit with an open end, which is also referred to as just a tip.

The invention seals may be utilized to seal a small well reaction chamber for a polynucleotide amplification reaction. The reaction chamber may be provided with reagents for PCR including a sample polynucleotide, polymerase, nucleoside triphosphates, a first primer hybridizable with the sample polynucleotide, and a second primer hybridizable with a sequence that is complementary to the sample polynucleotide, wherein the first and second primers define the termini of the amplified polynucleotide product. The well and seal will experience thermal cycling the contents of the amplification reaction chamber, such that, in each cycle, e.g., the temperature is controlled to 1) dehybridize ("melt") double stranded polynucleotide, 2) anneal the primers to single stranded polynucleotide, and 3) synthesize amplified polynucleotide between the primers. Other amplification methods available in the art also may be utilized, including, but not limited to: (1) target polynucleotide amplification methods such as self-sustained sequence replication (3SR) and strand-displacement amplification (SDA); (2) methods based on amplification of a signal attached to the target DNA, such as "branched chain" DNA amplification (Chiron Corp.); (3) methods based on amplification of probe DNA, such as ligase chain reaction (LCR) and QB replicase amplification (QBR); and (4) various other methods such as ligation activated transcription (LAT), nucleic acid sequence-based amplification (NASBA), repair chain reaction (RCR) and cycling probe reaction (CPR) (for a review of these methods, see pp. 2–7 of The Genesis Report, DX, Vol. 3, No. 4, February 1994; Genesis Group, Montclair, N.J.).

A main object of the invention seal is to provide an assembly to ensure a contamination-free processing of samples and reagents to a degree which is sufficient to comply with the requirements of nucleic acid purification methods which provide nucleic acid samples having a high degree of purity and being thereby suitable to be amplified.

DETAILED DESCRIPTION OF THE INVENTION

The invention is now discussed with reference to the Figures.

Figure 1:
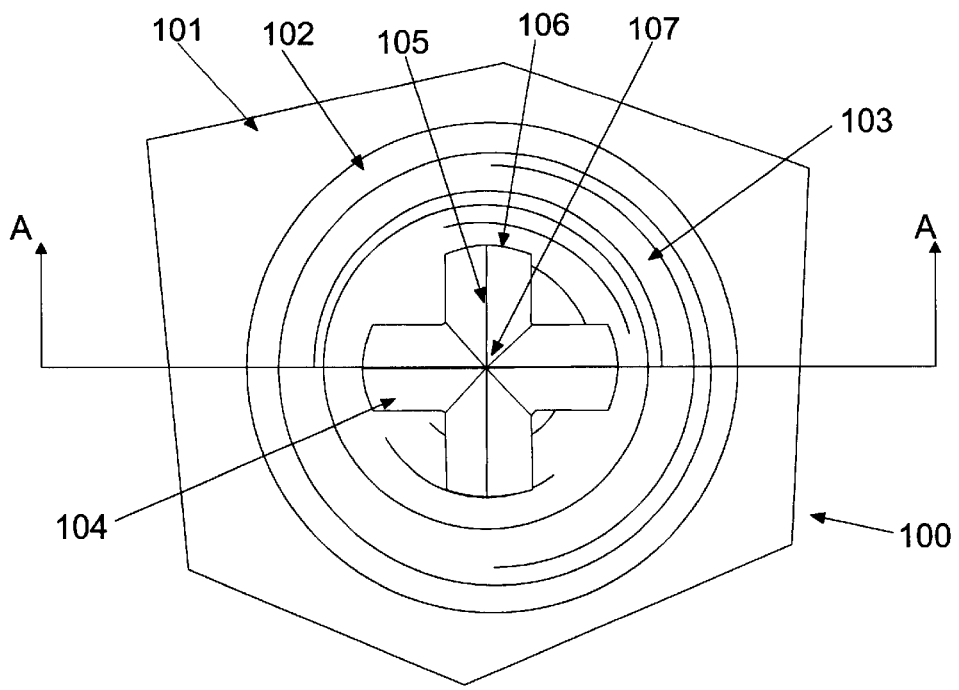
FIG. 1 is a top view of a radially round concavity embodiment of the invention.

FIG. 1 is a top view of the invention device 100 having a round axial cross section conformable to seal against the walls of a reaction well. The diameters and depths of such reaction wells are well known in the art. The composition of the device 100 is preferably a polymer having at least a slight elastomer quality appropriate for contact with the reaction well products, such as a silicon rubber or other such material. The reaction wells themselves comprise for example polystyrene, polyethylene, polypropylene or polycarbonate. The prior art general has shown that sealing the reaction wells in the thermal cycling steps could be done with a substantially rigid polymer sheet having a set of concave impressions adapted to seal the reaction wells. The obvious problem with such a rigid sheet of concave impressions is that it has to be completely removed from the reaction well sheet to access the samples in the reaction wells. Alternately, thin polymer films have in the prior art been adhered about the top edges of the reaction wells by adhesive or direct or dielectric heat sealing. Once broken, these single use films cannot seal the reaction well.

Figure 2:
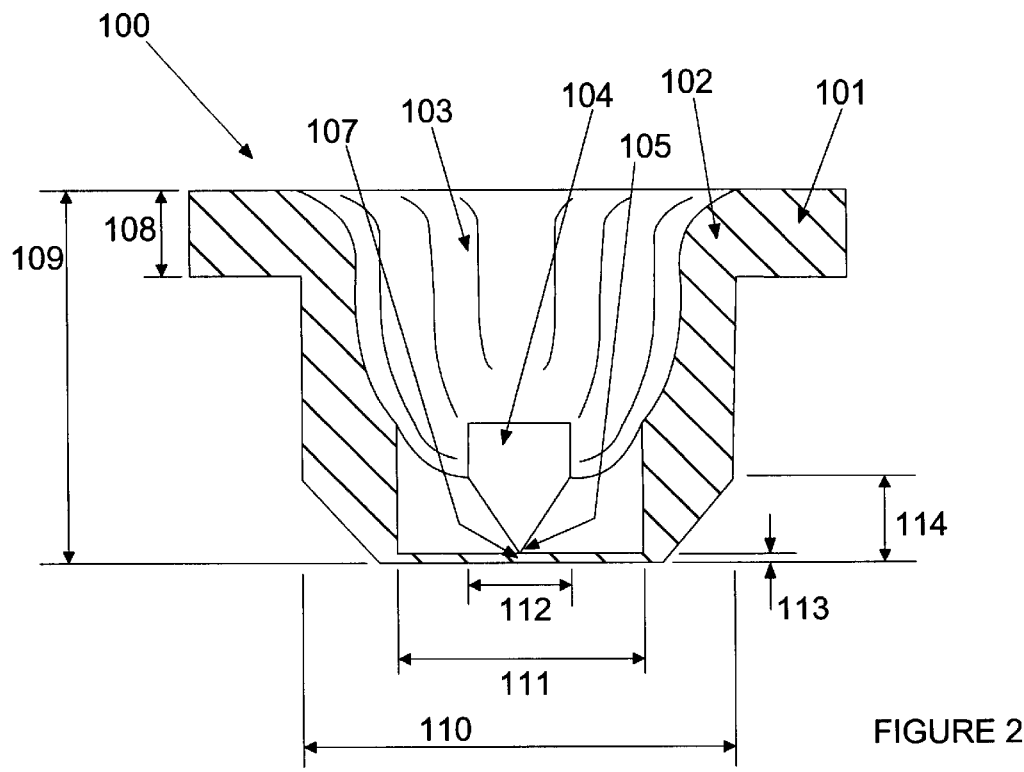
FIG. 2 is cross section AA of FIG. 1.

Device 100 comprises a top sheet 101 continuous with a edge transition 102 extending to side walls 103, whose outer surface seals against the upper portion of a reaction well when device 100 is inserted therein. Sidewalls 103 partially form a concave space with an impression 104, the lowest part thereof is a trace 105. Impression 104 has in the embodiment of FIG. 1 a generally cross or X shape having ends 106 and an impression trace crossing point 107. FIG. 2 shows section AA of FIG. 1 impression 104 is generally beveled although the relative angle of the beveling may be varied widely from a about 15 degrees to about 120 degrees, while the embodiment of FIG. 2 shows the angle to be about 60 degrees. The impression 104 may be rounded or arcuate so long as at its lowest impression the trace 105 forms a continuous trace such that a pierceable septum is formed between the trace and the outside surface of the bottom of device 100.

Although dimensions are now given for a preferred embodiment, these specific dimensions do not limit the scope of the invention. Sheet 101 has a thickness 108 of about 0.04 inches while the height 109 of device 100 is about 0.18 inches. The outside diameter of side walls 103 is about 0.22 inches. The length 111 of one of the cross bars of the X shaped impression 104 is about 0.13 inches while its width 112 is about 0.04 inches. The thickness 113 is for the pierceable septum of the invention and is about 0.008 inches (but may be from 0.025 inches to less than 0.001 inches) while the height 114 is the distance from the bottom side of device 100 to the non-impression bottom of the side walls 103 and is about 0.04 inches.

Figure 3:
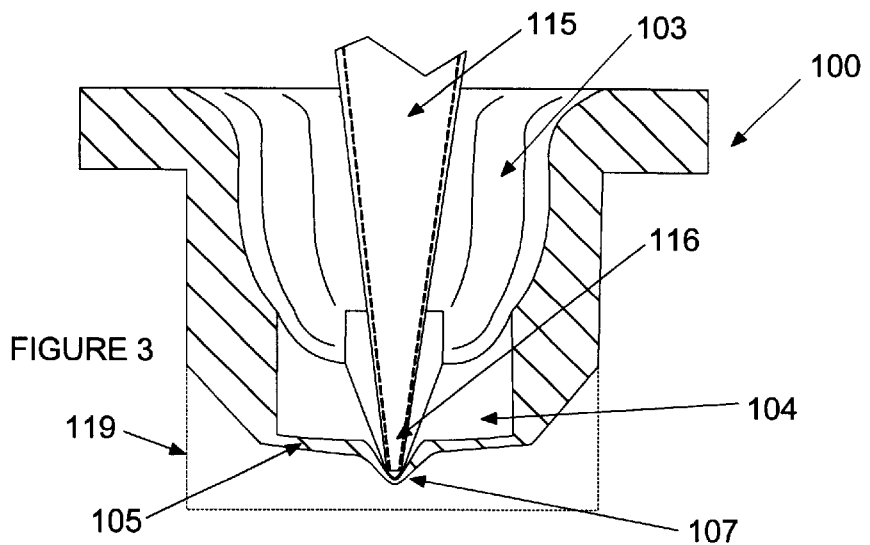
FIGS. 3 to 5 are the device of FIG. 2 showing the effect of respectively applying, inserting and removing a pipette tip to, through and from the septum of the embodiment with virtually no disturbance of the super-liquid space.
Figure 4:
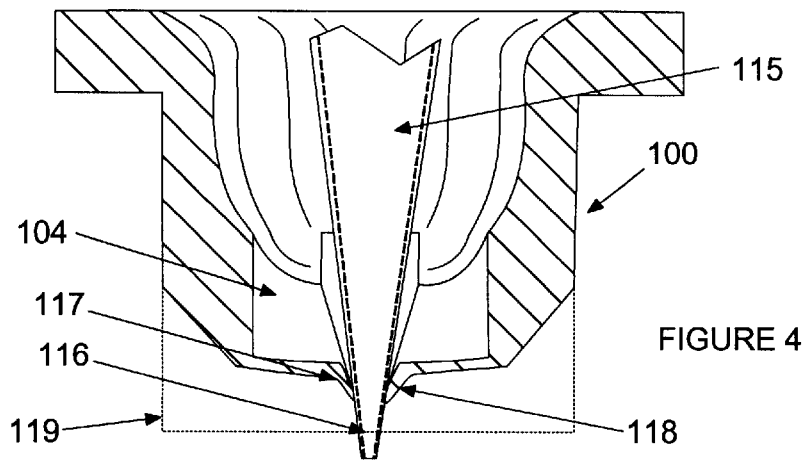
Figure 5:
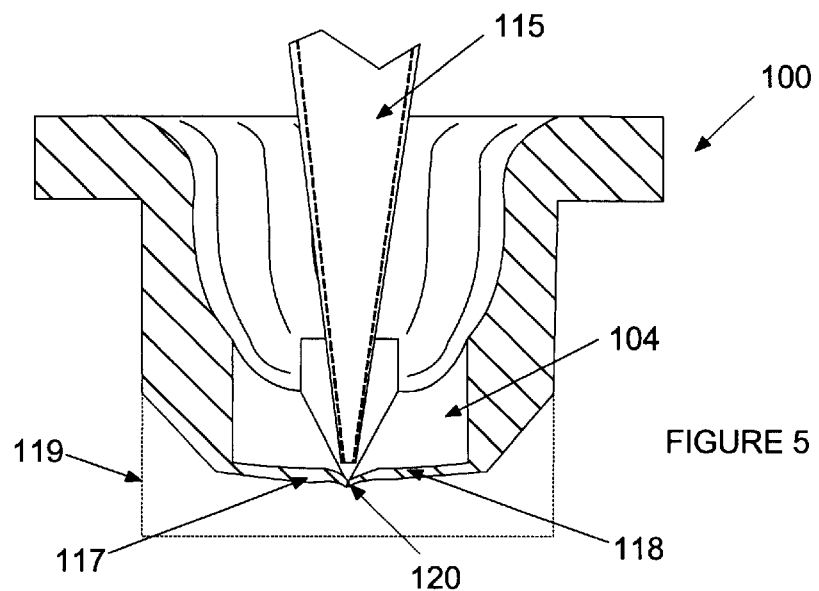

FIGS. 3–5 demonstrate the efficiency of the invention device. FIG. 3 shows a pipette cannula 115 with tip 116 pressed against the thin elastomeric point 107, whereby super liquid space 1 19 is reduced in volume by only about 5–10% by the impression of tip 116 to a breaking point of the septum. FIG. 4 shows tip 116 having broken through the septum forming resealable flanges 117 and 118. The opening of the septum by further insertion of the tip 116 as in FIG. 4 is not intended to gas tight against the exterior air. The linear, sharp angled or arcuate shape of the trace 105 as in FIG. 4 permits a very slight gap at adjacent opened flanges so that injection or removal of liquid to the reaction well does not cause undue position or negative pressurization of the reaction well, a preferred pressure being about atmospheric to minimize gas influx or rejection from the reaction well. Thus, the means to accomplish access to the reaction well are achieved with the super liquid space being disturbed or pressurized minimally by the piercing or re-opening of the septum and/or flanges such that gas disturbance or exchange occurs substantially only by insertion of tip 116 and/or addition or removal of liquid. FIG. 5 shows that upon removal of tip 116, flanges 117 and 118 close to form a substantially gas tight seal 120 sufficient to prevent substantial super liquid gas emission during thermal cycling or ambient temperature conditions. The structure that makes this remarkable result possible for the present embodiment is the substantially thickened bottom portion of device 100 such that an impressioned portion can be created to form a trace with a thin wall to form a recloseable septum capable of being pierced by a pipette tip. When a tip 116 is re-applied to the seal 120, flanges 117 and 1 18 again part with a small exterior air opening at the flange adjacency whereafter withdrawal of the tip 116 again causes substantially gas tight seal 120 to form again. The structure permits the user to add and remove liquid and thereafter thermal cycle the reaction well or wells.

Figure 6:
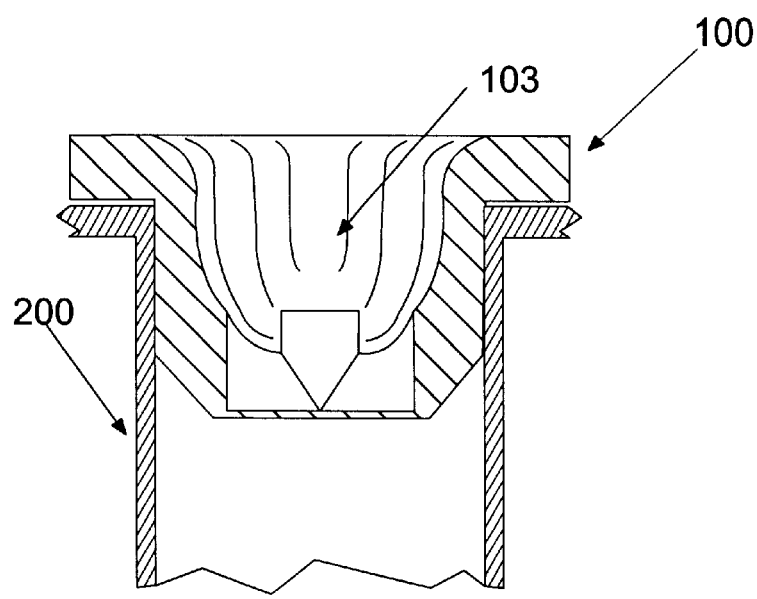
FIG. 6 is the device of FIG. 2 applied to the top side walls of a broken away view of a single reaction well.
Figure 7:
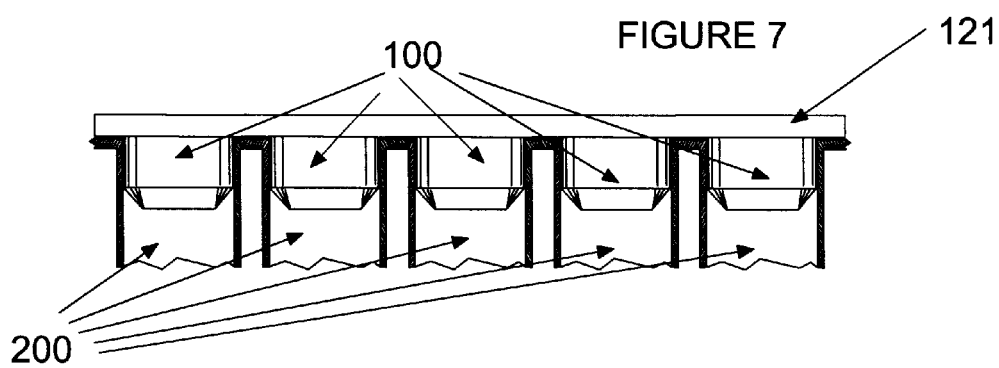
FIGS. 7 and 8 show a side view of a connected sheet of the devices of FIGS. 1 and 2 respectively sealing and being partly lifted from a support plate with an equal and corresponding number of broken away view reaction wells.
Figure 8:
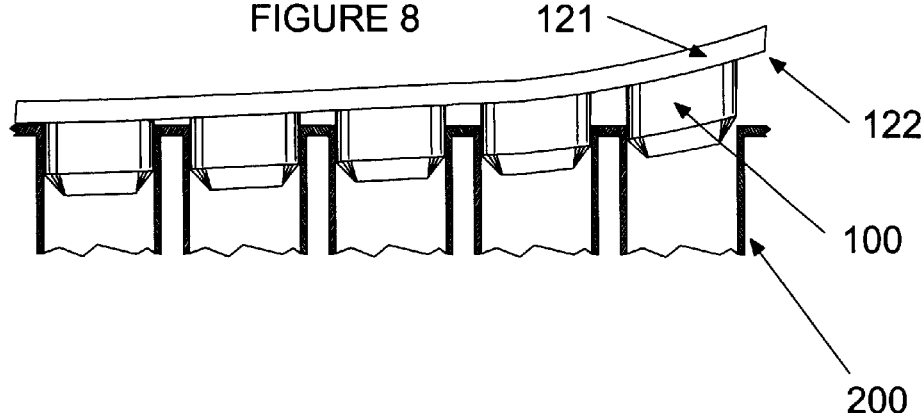

FIG. 6 shows the device of FIG. 2 as applied to the broken away walls of a reaction well 200 showing that the outside surface of side walls 103 sealingly contact the inside walls of well 200. Reaction wells 200 comprise a number of differently shaped lower portions (not shown) for containment of liquid samples. FIG. 7 shows a number of devices 100 joined continuously in a flexible sheet 121 such that devices 100 seal the samples contained in reaction wells 200. FIG. 8 shows that sheet 121 may be easily removed with lifting in direction 122 away from the support sheet for reaction wells 200.

Figure 9:
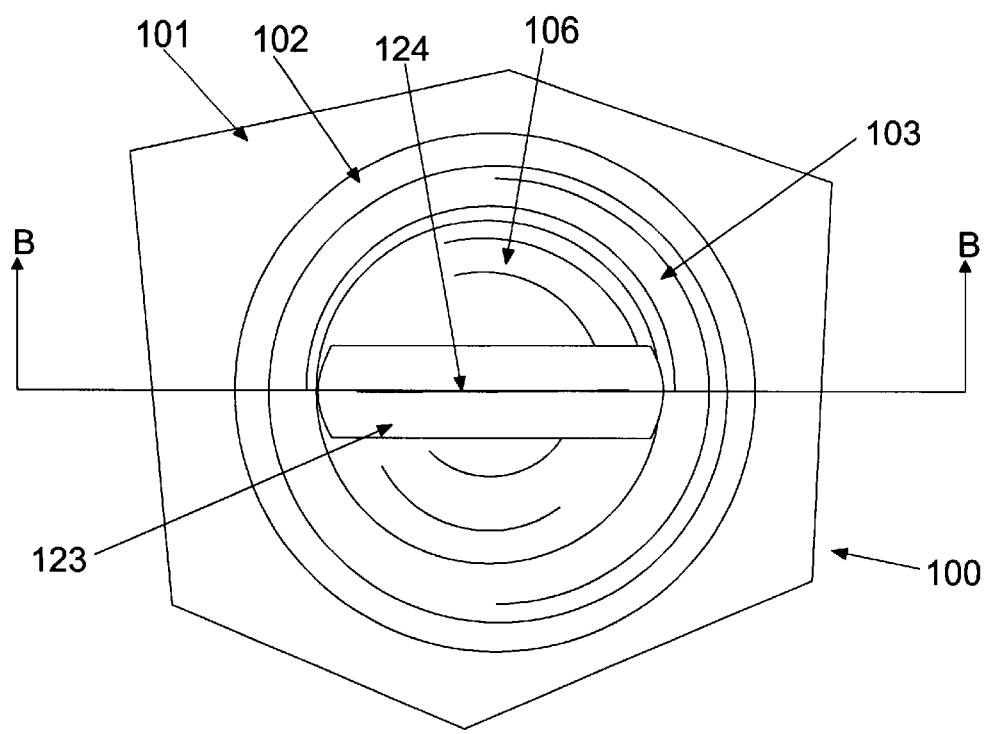
FIGS. 9 and 10 are top and side section BB of FIG. 9 views of an alternate embodiment of the invention device.
Figure 10:
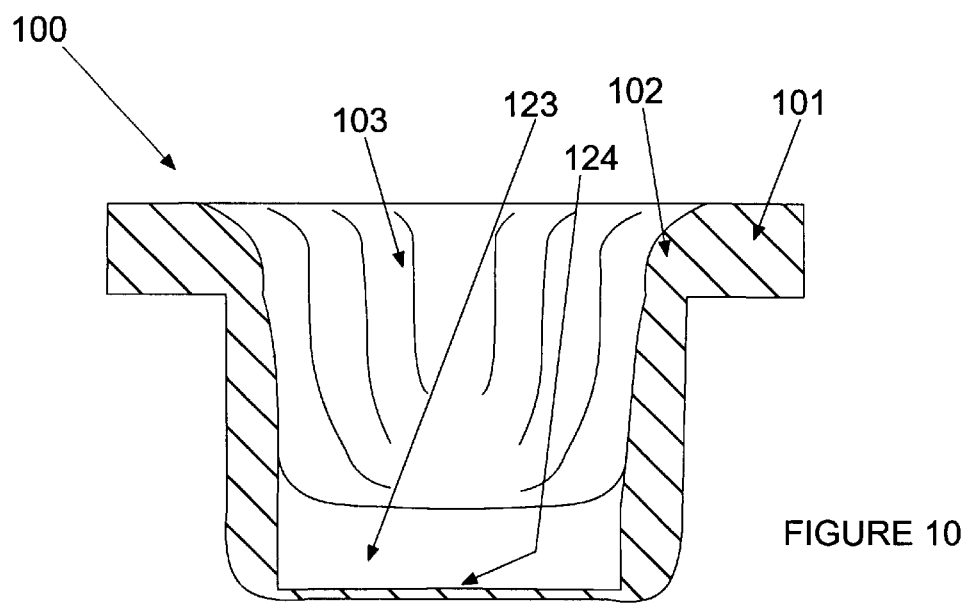

An alternate impression 123 and septum trace line 124 is shown in FIGS. 9 and 10, whereby the trace line is substantially a straight line as opposed to the X shape of FIGS. 1 and 2.

Figure 12:
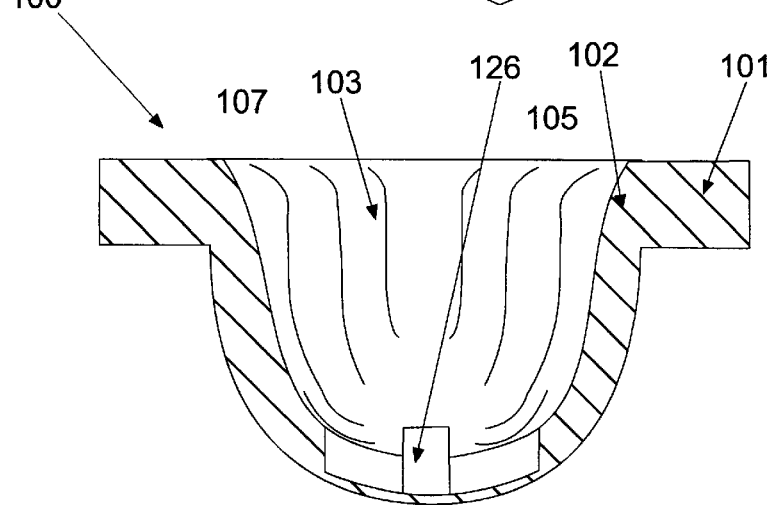
Figure 13:
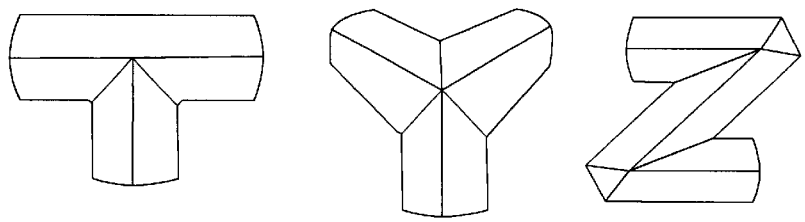
FIG. 13 shows alternate impressions and septa trace lines of the invention device.

An alternate impression 126 where the entire floor of the impression is the septum trace is shown in FIGS. 12 and 13, whereby the trace line is substantially an X shape similar to the X shape of FIGS. 1 and 2. The bottom portion of the device 100 in FIGS. 12 and 13 is rounded substantially to the shape of the bottom portion of the concavity formed extending from side walls 103.

The present invention also comprises a very large number of alternate impressions and trace lines for septa as shown in FIG. 13. It is well known in the art that some reaction wells are substantially square in axial cross section as well as round. With the disclosure herein, the outside walls of side walls 103 may be adapted to form a gas tight seal to such other reaction well. The present invention device has also been found to comprise an effective gas tight seal after septum piercing even after freezing and thawing. The present invention device with an impression width 112 of about 0.04 inches is most effective for pipette tips with a free end outside diameter of from about 0.01 to 0.30 inches. Larger diameters may be optimized with further adaptation of the invention device, i.e., making width 112 wider and adjusting the impression bevel angle.

Figure 11:
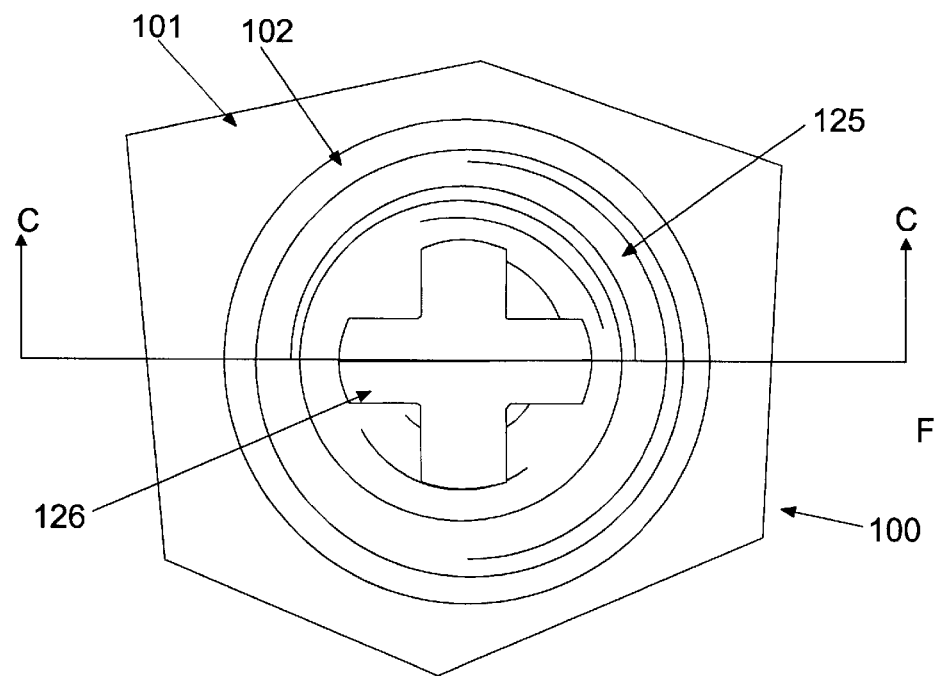
FIGS. 11 and 12 are top and side section CC of FIG. 9 views of an alternate embodiment of the invention device.
Figure 14:
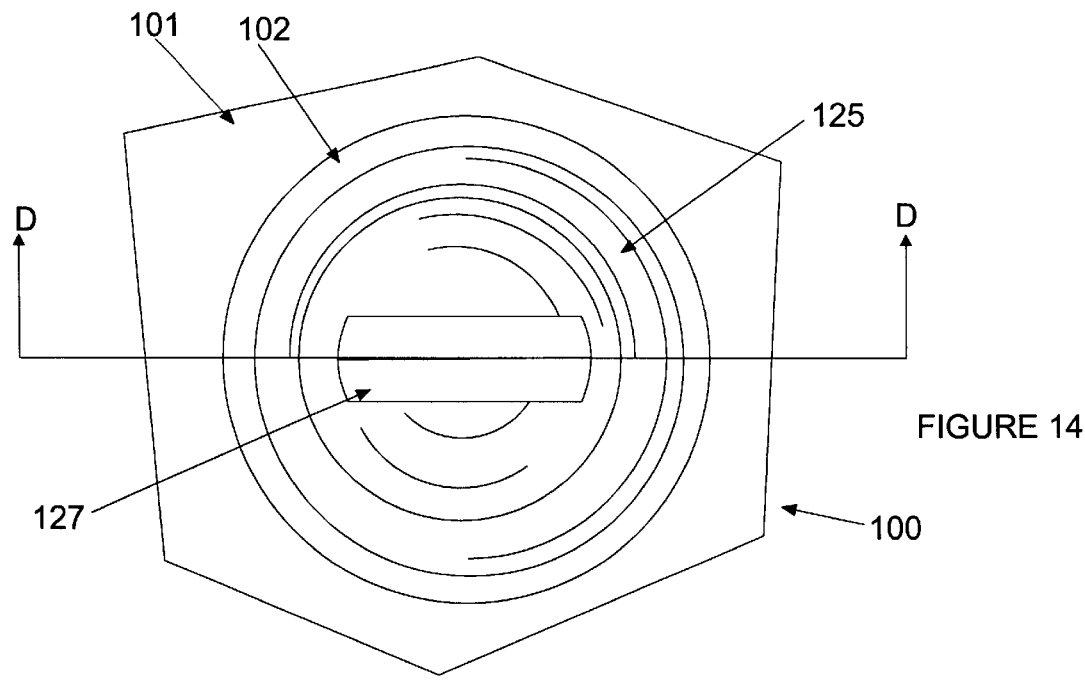
FIGS. 14 and 15 are top and side section DD of FIG. 9 views of an alternate embodiment of the invention device.
Figure 15:
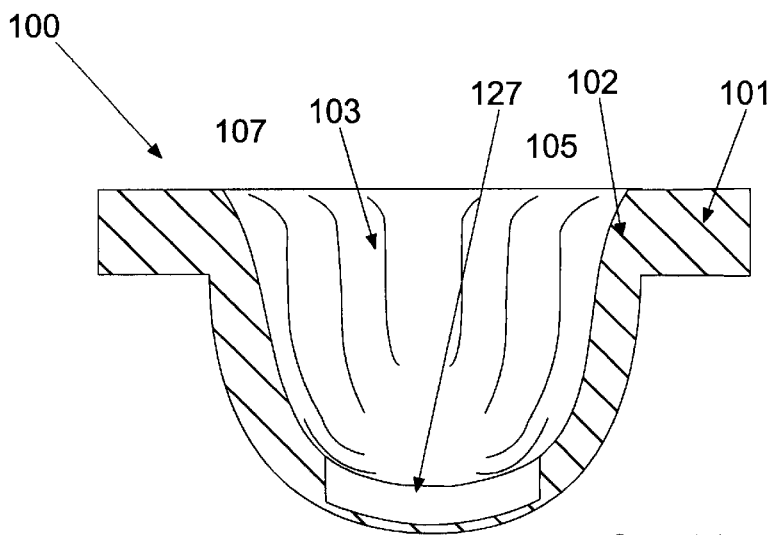

FIGS. 14 and 15 comprise substantially the embodiment of FIGS. 11 and 12 except that the alternate impression 127 is formed on the bottom end of side walls 103 or zone whose outside surface would be closest to the liquid surface in use. It has been found that large scale production makes more difficult septa impressions other than the single line wide traces, such as in FIGS. 14 and 15, or the beveled edge vertex traces, such as in FIGS. 9 and 10. The width of the wide trace septa embodiment is adapted to maintain, as for the above description for the vertex septa, a liquid and substantially gas tight seal even after having been pierced one or more times by a pipette tip.

The above design disclosures present the skilled person with considerable and wide ranges from which to choose appropriate obvious modifications for the above examples. However, the objects of the present invention will still be obtained by the skilled person applying such design disclosures in an appropriate manner.

I claim:

1. A sealing device adapted to seal one or more wells on a PCR plate comprising:
   (a) a support surface adapted to sealingly support around a peripheral edge a concave and downward extension of the support surface;
   (b) the extension comprising a bottom portion having a bottom thickness and an impression along a lowest part of the bottom portion, the impression comprising an impression thickness at the bottom of the impression, such that the impression thickness is substantially less than the bottom thickness;
   (c) an outer surface of an upper part of the extension is adapted to sealingly engage a top and inner rim part of a PCR plate well; and
   (d) at least the bottom portion comprises a rubber or elastomer material adapted to be pierced by a pipette through the area of impression thickness.

2. The device of claim 1 wherein the impression thickness is from about 0.025 inches to less than about 0.001 inches.

3. The device of claim 1 wherein the lowest point of the bottom surface of the bottom portion is adapted to not touch a liquid in a well sealed by the device when a user is adding liquid to the well through an opening made in the impression.

4. The device of claim 1 wherein the impression is an I-shape, an X-shape or a Z-shape in a top view.

5. The device of claim 1 wherein the support surface extends laterally so that a plurality of the devices are substantially adjacent to each other.

6. The device of claim 5 wherein the support surface comprises 64 or 96 extensions.

7. The device of claim 5 wherein the support surface comprises the same material as the bottom portion.

8. The device of claim 1 wherein the impression comprises a substantially V-shape in cross section.

9. The device of claim 1 wherein the impression comprises a substantially U-shape in cross section.

10. A method of using a sealing device to seal one or more wells on a PCR plate comprising:
    (a) a support surface adapted to sealingly support around a peripheral edge a concave and downward extension of the support surface;
    (b) the extension comprising a bottom portion having a bottom thickness and an impression along a lowest part of the bottom portion, the impression comprising an impression thickness at the bottom of the impression, such that the impression thickness is substantially less than the bottom thickness;
    (c) an outer surface of an upper part of the extension is adapted to sealingly engage a top and inner rim part of a small well adapted to- contain a liquid containing ribonucleic acids;
    (d) at least the bottom portion comprises a rubber or elastomer material;
    (e) sealingly engaging the extension to the top of the small well; and
    (f) pressing the tip of a pipette onto the surface and through the impression at the impression thickness area and delivering or withdrawing liquid from the well.

11. The device of claim 10 wherein the impression thickness is from about 0.025 inches to less than about 0.001 inches.

12. The device of claim 10 wherein a lowest point of the bottom surface of the bottom portion is adapted to not touch the liquid in the small well.

13. The device of claim 10 wherein the impression is an I-shape, an X-shape or a Z-shape in a top view.

14. The device of claim 10 wherein the support surface extends laterally so that a plurality of the devices are substantially adjacent to each other.

15. The device of claim 14 wherein the support surface comprises 64 or 96 extensions.

16. The device of claim 14 wherein the support surface comprises the same material as the bottom portion.

17. The device of claim 10 wherein the impression comprises a substantially V-shape in cross section.

18. The device of claim 10 wherein the impression comprises a substantially U-shape in cross section.

* * * * *